US012562787B2

(12) United States Patent　　　(10) Patent No.: US 12,562,787 B2
Qiang et al.　　　　　　　　　　　(45) Date of Patent: Feb. 24, 2026

(54) UE-ASSISTED PRECODER SELECTION IN ACTIVE ANTENNA SYSTEM (AAS)

(71) Applicant: Telefonaktiebolaget LM Ericsson (publ), Stockholm (SE)

(72) Inventors: Yongquan Qiang, Ottawa (CA); Jianguo Long, Ottawa (CA); Kevin Luo, Nepean (CA); Mats Åhlander, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/711,616

(22) PCT Filed: Dec. 7, 2021

(86) PCT No.: PCT/IB2021/061429
§ 371 (c)(1),
(2) Date: May 20, 2024

(87) PCT Pub. No.: WO2023/105266
PCT Pub. Date: Jun. 15, 2023

(65) Prior Publication Data
US 2025/0047335 A1　　Feb. 6, 2025

(51) Int. Cl.
H04B 7/02　　　　(2018.01)
H04B 7/0456　　　(2017.01)
(Continued)

(52) U.S. Cl.
CPC ......... H04B 7/0456 (2013.01); H04B 7/0626 (2013.01); H04W 24/10 (2013.01)

(58) Field of Classification Search
CPC .. H04B 7/0456; H04B 7/0626; H04B 7/0417; H04W 24/10
(Continued)

(56) References Cited

U.S. PATENT DOCUMENTS

2017/0117943 A1\* 4/2017 Rahman .............. H04B 7/0478
2018/0241454 A1　8/2018 Lee et al.
(Continued)

FOREIGN PATENT DOCUMENTS

WO　2020/127786 A1　6/2020
WO　2021/016023 A1　1/2021

OTHER PUBLICATIONS

International Search Report and Written Opinion issued for PCT/IB2021/061429 mailed on Aug. 31, 2022.
(Continued)

*Primary Examiner* — Helene E Tayong
(74) *Attorney, Agent, or Firm* — Sonoda & Kobayashi Intellectual Property Law; Sarvajit S. Patil

(57) ABSTRACT

Systems and methods for User Equipment (UE)-assisted precoder selection are provided. In one embodiment, a method implemented in a base station for transmitting data to a UE includes transmitting, to the UE, Channel State Information Reference Signal (CSI-RS) on two sets of CSI-RS resources; receiving, from the UE, two sets of CSI; estimating a first channel capacity for the codebook-based precoder based on the first set of CSI and a second channel capacity for the non-codebook-based precoder based on the second set of CSI; selecting one precoder from the codebook-based precoder and the non-codebook-based precoder based on the first channel capacity and the second channel capacity; and performing data transmission to the UE using the selected precoder. Embodiments of the proposed solution enable selecting a best precoder from the codebook-based precoder and the non-codebook-based precoder.

18 Claims, 13 Drawing Sheets

(51) Int. Cl.
H04B 7/06 (2006.01)
H04W 24/10 (2009.01)

(58) Field of Classification Search
USPC ......................................................... 375/267
See application file for complete search history.

(56) References Cited

U.S. PATENT DOCUMENTS

| | | | |
|---|---|---|---|
| 2019/0372643 A1* | 12/2019 | Kim ...................... | H04L 5/0094 |
| 2020/0127786 A1 | 4/2020 | Kwak et al. | |
| 2022/0033924 A1 | 2/2022 | Fluch et al. | |
| 2022/0278796 A1 | 9/2022 | Huang et al. | |

OTHER PUBLICATIONS

Samsung, "Discussion on CQI for Rel. 13 TDD FD-MIMO", 3GP Draft: R1-153390 TDD CQI Enhancement, 3rd Generation Partnership Project (3GP), Mobile Competence Centre; 650, Route Des Lucioles: F-06921 Sophia-Antipolis Cedex; France, vol. RAN WG1, No. Fukuoka, Japan; May 25, 2015-May 29, 2015, May 24, 2015.
Mattia Rebato et al., "Performance Assessment of MIMO Precoding on Realistic mmWave Channels", ARXIV:1903.1133ov1, 2019 IEEE International Conference on Communications Workshops (ICC Workshops), 6 pages, DOI: 10.1109/ICC47724.2019.
ESTI, 3rd Generation Partnership Project (3GPP), Technical Specification Group Radio Access Network; NR; Radio Resource Control (RRC) protocol specification (Release 15) (3GPP TS 38.331 V15. 4.0), Dec. 2018.
ESTI, 3rd Generation Partnership Project (3GPP), Technical Specification Group Radio Access Network; NR; Physical layer procedures for data (Release 15) (3GPP TS 38.214 V15.4.0), Dec. 2018.

* cited by examiner

Table 5.2.2.2.1-3: Mapping of $i_{1,3}$ to $k_1$ and $k_2$ for 2-layer CSI reporting

| $i_{1,3}$ | $N_1 > N_2 > 1$ | | $N_1 = N_2$ | | $N_1 = 2, N_2 = 1$ | | $N_1 > 2, N_2 = 1$ | |
|---|---|---|---|---|---|---|---|---|
| | $k_1$ | $k_2$ | $k_1$ | $k_2$ | $k_1$ | $k_2$ | $k_1$ | $k_2$ |
| 0 | 0 | 0 | 0 | 0 | 0 | 0 | 0 | 0 |
| 1 | $O_1$ | 0 | $O_1$ | 0 | $O_1$ | 0 | $O_1$ | 0 |
| 2 | 0 | $O_2$ | 0 | $O_2$ | | | $2O_1$ | 0 |
| 3 | $2O_1$ | 0 | $O_1$ | $O_2$ | | | $3O_1$ | 0 |

Table 5.2.2.2.1-4: Mapping of $i_{1,3}$ to $k_1$ and $k_2$ for 3-layer and 4-layer CSI reporting when $P_{CSI-RS} < 16$

| $i_{1,3}$ | $N_1 = 2, N_2 = 1$ | | $N_1 = 4, N_2 = 1$ | | $N_1 = 6, N_2 = 1$ | | $N_1 = 2, N_2 = 2$ | | $N_1 = 3, N_2 = 2$ | |
|---|---|---|---|---|---|---|---|---|---|---|
| | $k_1$ | $k_2$ | $k_1$ | $k_2$ | $k_1$ | $k_2$ | $k_1$ | $k_2$ | $k_1$ | $k_2$ |
| 0 | $O_1$ | 0 | $O_1$ | 0 | $O_1$ | 0 | $O_1$ | 0 | $O_1$ | 0 |
| 1 | | | $2O_1$ | 0 | $2O_1$ | 0 | $O_1$ | $O_2$ | $O_1$ | $O_2$ |
| 2 | | | $3O_1$ | 0 | $3O_1$ | 0 | $O_1$ | $O_2$ | $O_1$ | $O_2$ |
| 3 | | | | | $4O_1$ | 0 | | | $2O_1$ | 0 |

*FIG. 2*

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

*FIG. 7*

| CQI index | modulation | code rate x 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

*FIG. 8*

UE-ASSISTED PRECODER SELECTION IN ACTIVE ANTENNA SYSTEM (AAS)

CROSS-REFERENCE TO RELATED APPLICATIONS

This patent application is a submission under 35 U.S.C. § 371 for U.S. national stage patent application of international application no. PCT/IB2021/061429 filed on Dec. 7, 2021 and entitled "UE-ASSISTED PRECODER SELECTION IN ACTIVE ANTENNA SYSTEM (AAS)," the entirety of which is incorporated herein by reference.

TECHNICAL FIELD

The present disclosure proposes a User Equipment (UE)-assisted precoder selection based on multiple Channel State Information Reference Signal (CSI-RS) configurations and multiple CSIs included in reports transmitted to a base station.

BACKGROUND

Active antenna system (AAS) is one of key technologies adopted by Fourth Generation (4G) Long Term Evolution (LTE) and Fifth Generation (5G) New Radio (NR) to enhance the wireless network performance and capacity by using multiple-input multiple-output (MIMO), for example, full dimension MIMO (FD-MIMO) or massive MIMO. A typical AAS system consists of two-dimensional antenna elements array with M rows, N columns and two cross-polarizations as shown in FIG. 1.

Precoding (beamforming) is used in the AAS to form User Equipment (UE)-specific beams toward a desired UE, which helps to increase the signal power to the desired UE and to reduce the interference to other UEs. A general system model with precoding can be formularized as:

$$y = H_{DL}Wx + n$$

$H_{DL}$ is Downlink (DL) channel matrix with dimension of $N_r \times N_t$. $N_t = 2MN$ is the number of transmitting antennas at a new radio base station (gNB) side. $N_r$ is the number of receiving antennas at UE side. W is the precoding matrix with $N_t \times v$. $v$ is the number of transmission layers.

Usually, there are two precoders to obtain the precoding matrix at the gNB side. One is a codebook-based precoder, which is based on pre-defined codebooks and UE's Precoding Matrix Indicator (PMI) reports. Another one is non-codebook-based precoders, such as a reciprocity-based precoder that is based on Uplink (UL) reference signals (e.g., Sounding Reference Signal (SRS)) and advanced precoding algorithms such as Maximum Ratio Combining (MRT), Zero-Forcing (ZF) and Minimum Mean Square Error (MMSE) in Time Division Duplex (TDD) system. The codebook-based precoder and the reciprocity-based precoder are further explained below.

Codebook-Based Precoder

For the codebook-based precoder, the Channel State Information Reference Signal (CSI-RS) resource with a number of ports $P_{CSI\_RS} = 2N_1N_2$ is configured together with codebook configuration of $(N_1, N_2)$. PMI is reported by the UE based on the configured CSI-RS and the codebook.

The precoding matrix (W) with codebook-based approach can be expressed by $$W = W_{p2\alpha}W_{PMI}$$

$W_{p2\alpha}$ is CSI-RS port-to-antenna mapping matrix with a $N_t \times P_{CSI\_RS}$. $W_{PMI}$ is precoding matrix with dimension of $P_{CSI\_RS} \times v$. $v$ is the number of layers. $W_{PMI}$ is derived from the UE's PMI report, based on the codebook defined in Third Generation Partnership Project (3GPP) specification TS 38.214 v16.7.0.

Currently, in Third Generation Partnership Project (3GPP), the codebook for ½-layer and ¾-layer with $P_{CSI\_RS} \leq 16$ is as follows:

| 1-layer: codebookMode = 1 | | |
|---|---|---|
| $i_{1,1}$ | $i_{1,2}$ | $i_2$ |
| $0, 1, \ldots, N_1O_1 - 1$ | $0, \ldots, N_2O_2 - 1$ | $0, 1, 2, 3$ $\quad W_{i_{1,1}, i_{1,2}, i_2}^{(1)}$ |

$$\text{where } W_{l,m,n}^{(1)} = \frac{1}{\sqrt{P_{CSI-RS}}} \begin{bmatrix} v_{l,m} \\ \varphi_n v_{l,m} \end{bmatrix}.$$

| 2-layer: codebookMode = 1 | | |
|---|---|---|
| $i_{1,1}$ | $i_{1,2}$ | $i_2$ |
| $0, 1, \ldots, N_1O_1 - 1$ | $0, \ldots, N_2O_2 - 1$ | $0, 1$ $\quad W_{i_{1,1},i_{1,1}+k_1, i_{1,2}, i_{1,2}+k_2,i_2}^{(2)}$ |

$$\text{where } W_{l,l',m,m',n}^{(2)} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}.$$

and the mapping from $i_{1,3}$ to $k_1$ and $k_2$ is given in Table 5.2.2.2.1-3 of TS 38.214 v16.7.0 (reproduced in FIG. 2).

| 3-layer ($P_{CSI-RS} \leq 16$): codebookMode = 1-2, $P_{CSI-RS} \leq 16$ | | |
|---|---|---|
| $i_{1,1}$ | $i_{1,2}$ | $i_2$ |
| $0, \ldots, N_1O_1 - 1$ | $0, 1, \ldots, N_2O_2 - 1$ | $0, 1$ $\quad W_{i_{1,1},i_{1,1}+k_1, i_{1,2}, i_{1,2}+k_2,i_2}^{(3)}$ |

$$\text{where } W_{l,l',m,m',n}^{(3)} = \frac{1}{\sqrt{3P_{CSI-RS}}} \begin{bmatrix} v_{l,m} & v_{l',m'} & v_{l,m} \\ \varphi_n v_{l,m} & \varphi_n v_{l',m'} & -\varphi_n v_{l',m'} \end{bmatrix}.$$

and the mapping from $i_{1,3}$ to $k_1$ and $k_2$ is given in Table 5.2.2.2.1-4 of TS 38.214 v16.7.0 (reproduced in FIG. 2).

| 4-layer ($P_{CSI-RS} \leq 16$): codebookMode = 1-2, $P_{CSI-RS} \leq 16$ | | |
|---|---|---|
| $i_{1,1}$ | $i_{1,2}$ | $i_2$ |
| $0, \ldots, N_1O_1 - 1$ | $0, 1, \ldots, N_2O_2 - 1$ | $0, 1$ $\quad W_{i_{1,1},i_{1,1}+k_1, i_{1,2}, i_{1,2}+k_2,i_2}^{(4)}$ |

$$\text{where } W_{l,l',m,m',n}^{(4)} = \frac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}.$$

and the mapping from $i_{1,3}$ to $k_1$ and $k_2$ is given in Table 5.2.2.2.1-4 of TS 38.214 v16.7.0 (reproduced in FIG. 2).

where $O_1$, $O_2$ are oversampling rates for beams in the horizontal and vertical directions, and $$v_{l,m} = v_l \otimes v_m$$

$v_l$ and $v_m$ denote horizontal and vertical beams formed by oversampled Discrete Fourier Transform (DFT) vectors with all available antenna ports in horizontal and vertical directions, expressed by:

$$v_l = \left[1, e^{\frac{j2\pi l}{N_1 O_1}}, \dots, e^{\frac{j2\pi(N_1-1)l}{N_1 O_1}}\right]^T, l = 0, 1, \dots, N_1 O_1 - 1$$

$$v_m = \left[1, e^{\frac{j2\pi m}{N_2 O_2}}, \dots, e^{\frac{j2\pi(N_2-1)m}{N_2 O_2}}\right]^T, m = 0, 1, \dots, N_2 O_2 - 1$$

(l,m) and (l',m') are beam indexes in horizontal and vertical direction, which can be determined from UE-reported PMI ($i_{1,1}$, $i_{1,2}$, $i_{1,3}$, $i_2$), denoted by:

$$l = i_{1,1}$$

$$m = i_{1,2}$$

$$l' = \mathrm{mod}(i_{1,1} + k_1, N_1 O_1)$$

$$m' = \mathrm{mod}(i_{1,2} + k_2, N_2 O_2)$$

$k_1$ and $k_2$ are determined according to $i_{1,3}$ to $k_1$ and $k_2$ mapping table 5.2.2.2.1-3 or table 5.2.2.2.1-4 defined in 3GPP standard TS 38.214 V16.7.0. Table 5.2.2.2.1-3 and Table 5.2.2.2.1-3 are reproduced in FIG. 2. $\varphi_n$ is co-phasing factor between two polarizations determined by UE reported co-phasing index $i_2$, denoted by $$\varphi_n = e^{j\pi n/2}, n = i_2$$

Currently, in 3GPP, the codebook for ¾-layer with $P_{CSI-RS} \geq 16$ is as follows:

| 3-layer ($P_{CSI-RS} \geq 16$): codebookMode = 1-2, $P_{CSI-RS} \geq 16$ | | | |
|---|---|---|---|
| $i_{1,1}$ | $i_{1,2}$ | $i_{1,3}$ | $i_2$ |
| $0, \dots, \frac{N_1 O_1}{2} - 1$ | $0, \dots, N_2 O_2 - 1$ | $0, 1, 2, 3$ | $0, 1$   $W_{i_{1,1}, i_{1,2}, i_{1,3}, i_2}^{(3)}$ | where $W_{l,m,p,n}^{(3)} = \dfrac{1}{\sqrt{3P_{CSI-RS}}}\begin{bmatrix} \tilde{v}_{l,m} & \tilde{v}_{l,m} & \tilde{v}_{l,m} \\ \theta_p \tilde{v}_{l,m} & -\theta_p \tilde{v}_{l,m} & \theta_p \tilde{v}_{l,m} \\ \varphi_n \tilde{v}_{l,m} & \varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} \end{bmatrix}.$

| 4-layer ($P_{CSI-RS} \geq 16$): codebookMode = 1-2, $P_{CSI-RS} \geq 16$ | | | |
|---|---|---|---|
| $i_{1,1}$ | $i_{1,2}$ | $i_{1,3}$ | $i_2$ |
| $0, \dots, \frac{N_1 O_1}{2} - 1$ | $0, \dots, N_2 O_2 -10, 1, 2, 3$ | | $0, 1$   $W_{i_{1,1}, i_{1,2}, i_{1,3}, i_2}^{(4)}$ | where $W_{l,m,p,n}^{(4)} = \dfrac{1}{\sqrt{4P_{CSI-RS}}}\begin{bmatrix} \tilde{v}_{l,m} & \tilde{v}_{l,m} & \tilde{v}_{l,m} & \tilde{v}_{l,m} \\ \theta_p \tilde{v}_{l,m} & -\theta_p \tilde{v}_{l,m} & \theta_p \tilde{v}_{l,m} & -\theta_p \tilde{v}_{l,m} \\ \varphi_n \tilde{v}_{l,m} & \varphi_n \tilde{v}_{l,m} & -\varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} & \varphi_n \theta_p \tilde{v}_{l,m} \end{bmatrix}.$ where $$\tilde{v}_{l,m} = \tilde{v}_l \otimes v_m$$

$\tilde{v}_l$ is horizontal beam formed by oversampled DFT vector with a half of antenna ports of horizontal direction, expressed by $$\tilde{v}_l = \left[1, e^{\frac{j4\pi l}{N_1 O_1}}, \dots, e^{\frac{j4\pi(N_1/2-1)l}{N_1 O_1}}\right]^T, l = 0, 1, \dots, N_1 O_1/2 - 1$$

The vertical beam ($v_m$) for 3-layer and 4-layer with $P_{CSI-RS} \geq 16$ are formed in a way as same as that of codebook with $P_{CSI-RS} < 16$.

(l,m) are determined from UE-reported PMI ($i_{1,1}$, $i_{1,2}$, $i_{1,3}$, $i_2$), denoted by $$l = i_{1,1}$$

$$m = i_{1,2}$$

$\theta_p$ is the co-phasing factor between two antenna port groups determined by UE reported inter-group co-phasing index $i_{1,3}$, denoted by $$\theta_p = e^{j\pi p/4}, p = i_{1,3}$$

$\varphi_n$ is co-phasing factor between two polarizations determined by UE reported inter-polarization co-phasing index $i_2$ as same as that of codebook with $P_{CSI-RS} < 16$.

Reciprocity-Based Precoder

In regard to the reciprocity based precoder, in a TDD system, by utilizing the reciprocity between a DL channel and a UL channel, the DL channel can be estimated by UL channel, expressed by $$H_{DL} = H_{UL}{}^T$$

where $H_{UL}$ is UL channel matrix with dimension of $N_r \times N_r$, which can be obtained by UL reference signal (e.g., SRS). Thus, DL precoding matrix can be calculated with different linear precoding methods, for example:

(a) Matched filter (MF) precoder:

$$W = H_{DL}{}^H$$

(b) ZF precoder:

$$W = H_{DL}{}^H (H_{DL} H_{DL}{}^H)^{-1}$$

(c) MMSE precoder:

$$W = H_{DL}^{H}\left(H_{DL}H_{DL}^{H} + \delta^2 I\right)^{-1}$$

where $\delta^2$ is noise variance.

SUMMARY

Systems and methods for User Equipment (UE)-assisted precoder selection in active antenna system (AAS) are disclosed herein. In one embodiment, a method implemented in a base station for transmitting data to a User Equipment (UE) comprises transmitting, to the UE, Channel State Information Reference Signal (CSI-RS) on two sets of CSI-RS resources comprising a first set of CSI-RS resources for a codebook-based precoder and a second set of CSI-RS resources for a non-codebook-based precoder; receiving, from the UE, two sets of CSI comprising a first set of CSI based on the CSI-RS transmitted on the first set of CSI-RS resources for the codebook-based precoder and a second set of CSI based on the CSI-RS transmitted on the second set of CSI-RS resources for the non-codebook-based precoder; estimating a first channel capacity for the codebook-based precoder based on the first set of CSI and a second channel capacity for the non-codebook-based precoder based on the second set of CSI; selecting one precoder from the codebook-based precoder and the non-codebook-based precoder based on the first channel capacity and the second channel capacity; and performing downlink data transmission to the UE using the selected precoder. Embodiments of the proposed solution enable selecting a best precoder from the codebook-based precoder and the non-codebook-based precoder.

In one embodiment, the non-codebook-based precoder is a reciprocity-based precoder.

In one embodiment, the method further comprises configuring the two sets of CSI-RS resources for the codebook-based precoder and the non-codebook-based precoder before transmitting the CSI-RS on the two sets of CSI-RS resources to the UE.

In one embodiment, the method further comprises configuring the two sets of CSI report configuration for the codebook-based precoder and the non-codebook-based precoder before triggering two sets of CSI report.

In one embodiment, the method further comprises configuring reportQuantity to 'cri-RI-PMI-CQI' in the first CSI report configuration for the codebook-based precoder, and configuring reportQuantity to 'cri-RI-CQI' in the second CSI report configuration for the non-codebook-based precoder.

In one embodiment, the method further comprises triggering, to the UE, transmission of the two sets of CSI.

In one embodiment, the CSI-RS transmitted on the second set of CSI-RS resources for the non-codebook-based precoder comprises L ports. L is a maximum number of layers on Physical Downlink Shared Channel (PDSCH) to be supported.

In one embodiment, each of the L ports corresponds to a transmission layer of PDSCH.

In one embodiment, CSI-RS transmitted on the second set of CSI-RS resources for the non-codebook-based precoder is UE-specific beamformed with a precoding matrix generated with a particular precoder.

In one embodiment, the particular precoder is one of (a) a Matching Filter (MF) precoder, (b) a Zero-Forcing (ZF) precoder, and (c) a Minimum Mean Square Error (MMSE) precoder.

In one embodiment, the first set of CSI for the codebook-based precoder comprises (a) a first Rank Indicator (RI) (b) a first Channel Quality Indicator (CQI) and (c) a first Precoding Matrix Indicator (PMI); and the second set of CSI for the non-codebook-based precoder comprises a second RI and a second CQI.

In one embodiment, the first channel capacity is estimated based on the first RI and the first CQI comprised in the first set of CSI; and the second channel capacity is estimated based on the second RI and the second CQI comprised in the second set of CSI.

In one embodiment, selecting the one precoder between the codebook-based precoder and the non-codebook-based precoder comprises selecting the one precoder based on a comparison of the first channel capacity and the second channel capacity.

Corresponding embodiments of a base station are also disclosed.

A base station adapted to: transmit, to the UE, CSI-RS on two sets of CSI-RS resources comprising a first set of CSI-RS resources for a codebook-based precoder and a second set of CSI-RS resources for a non-codebook-based precoder; receive, from the UE, two sets of CSI comprising a first set of CSI based on the CSI-RS transmitted on the first set of CSI-RS resources for the codebook-based precoder and a second set of CSI based on the CSI-RS transmitted on the second set of CSI-RS resources for the non-codebook-based precoder; estimate a first channel capacity for the codebook-based precoder based on the first set of CSI and a second channel capacity for the non-codebook-based precoder based on the second set of CSI; select one precoder from the codebook-based precoder and the non-codebook-based precoder based on the first channel capacity and the second channel capacity; and perform downlink data transmission to the UE using the selected precoder.

A base station comprising processing circuitry configured to cause the base station to: transmit, to the UE, CSI-RS on two sets of CSI-RS resources comprising a first set of CSI-RS resources for a codebook-based precoder and a second set of CSI-RS resources for a non-codebook-based precoder; receive, from the UE, two sets of CSI comprising a first set of CSI based on the CSI-RS transmitted on the first set of CSI-RS resources for the codebook-based precoder and a second set of CSI based on the CSI-RS transmitted on the second set of CSI-RS resources for the non-codebook-based precoder; estimate a first channel capacity for the codebook-based precoder based on the first set of CSI and a second channel capacity for the non-codebook-based precoder based on the second set of CSI; select one precoder from the codebook-based precoder and the non-codebook-based precoder based on the first channel capacity and the second channel capacity; and perform downlink data transmission to the UE using the selected precoder.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 2 includes Table 5.2.2.2.1-3 and Table 5.2.2.2.1-4 of TS 38.214 v16.7.0

FIG. 7 includes Table 5.2.2.1-2 of 3GPP TS 38.214 V16.7.0.

FIG. 8 includes Table 5.2.2.1-3 of 3GPP TS 38.214 V16.7.0.

DETAILED DESCRIPTION

Figure 1:
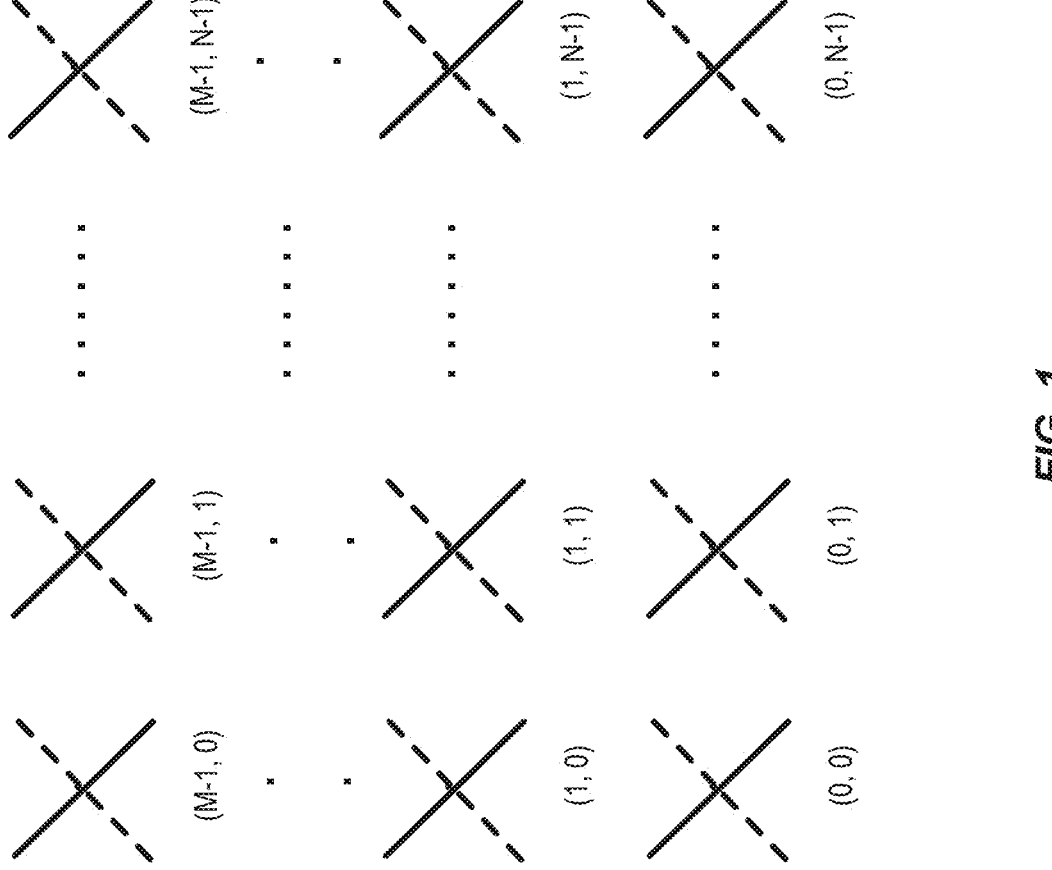
FIG. 1 illustrates a typical active antenna system (AAS) system.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 3:
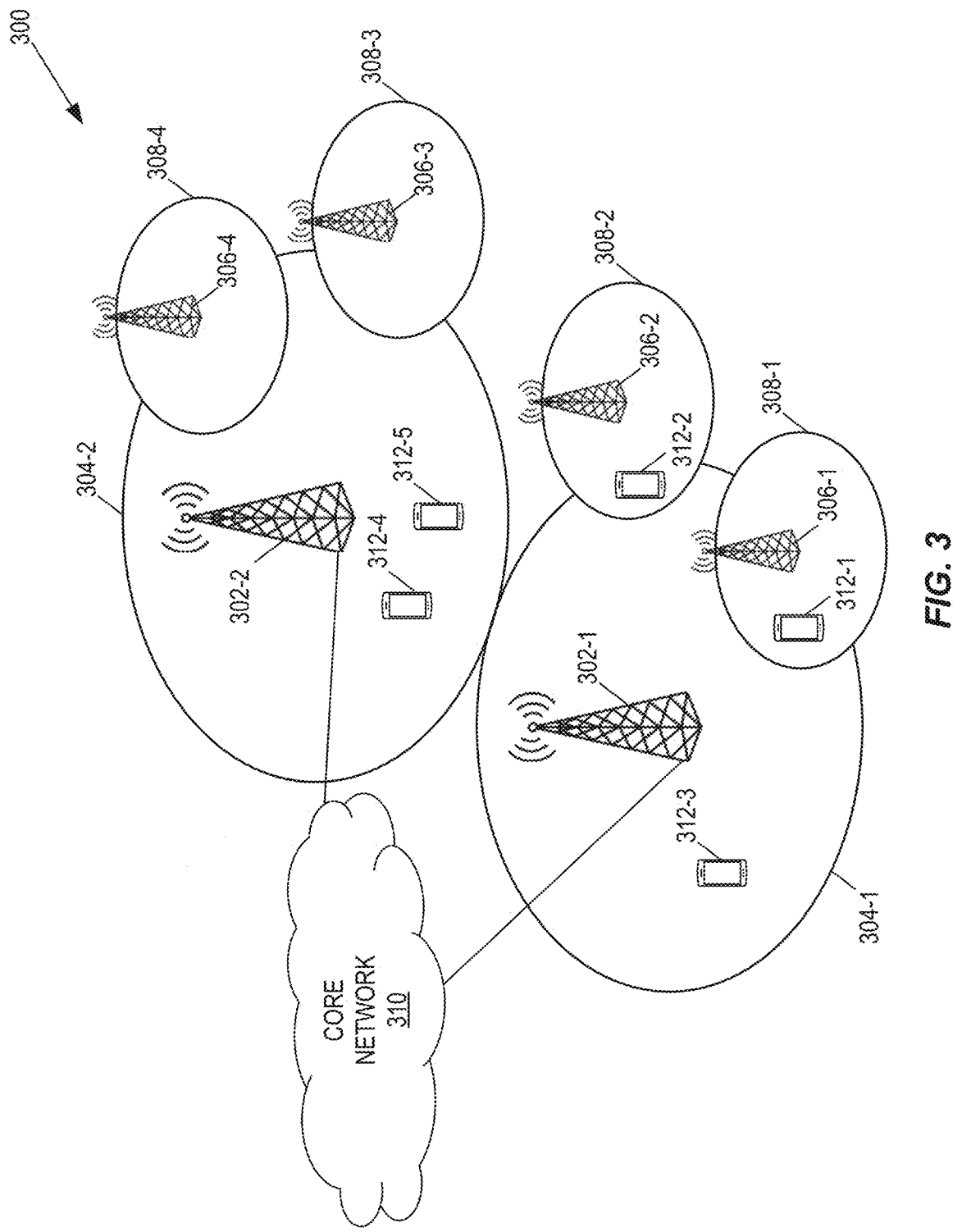
FIG. 3 illustrates one example of a cellular communications system according to some embodiments of the present disclosure.

FIG. 3 illustrates one example of a cellular communications system 300 in which embodiments of the present disclosure may be implemented. In the embodiments described herein, the cellular communications system 300 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN 302 includes base stations 302-1 and 302-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5G System (5GS) is referred to as the 5GC. The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs, but the present disclosure is not limited thereto.

Figure 9:
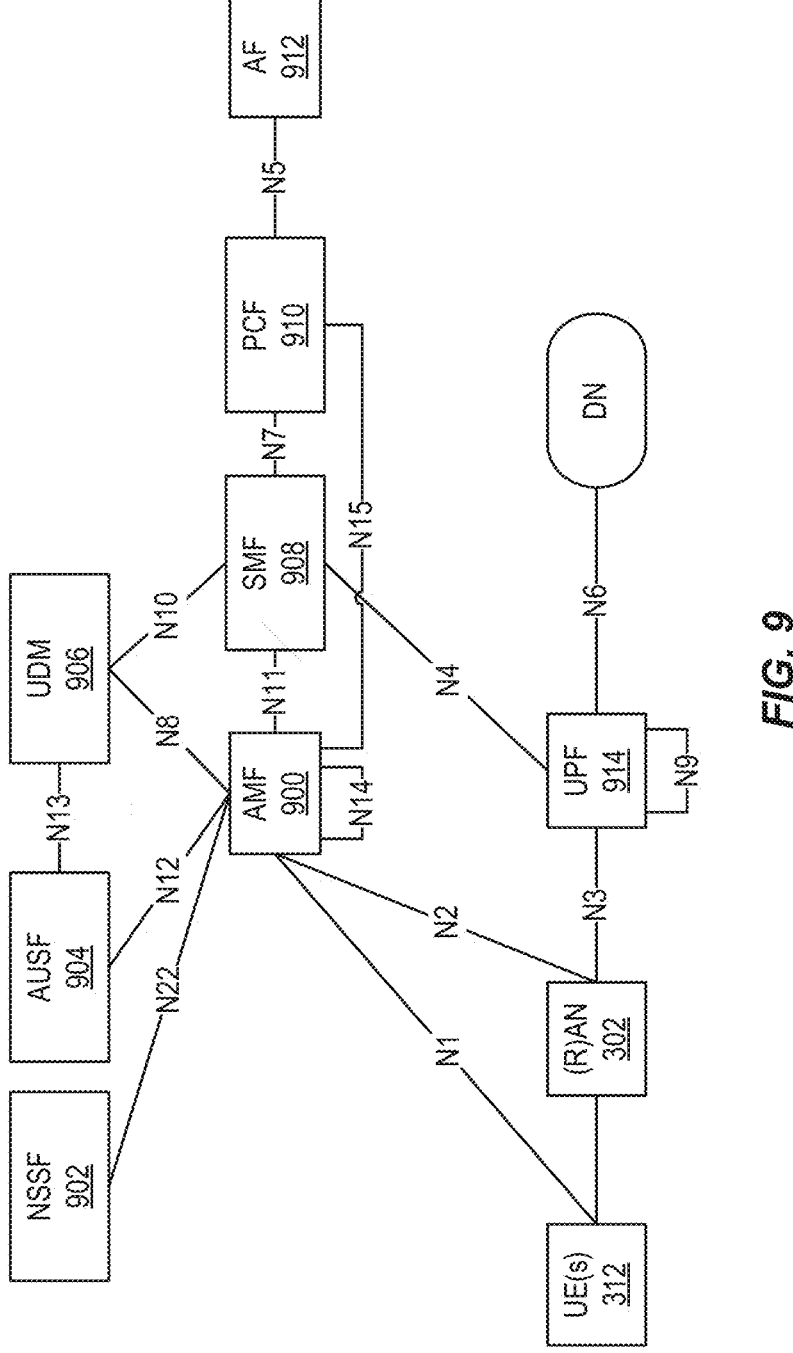
FIGS. 9 and 10 illustrate example embodiments in which the cellular communication system of FIG. 3 is a Fifth Generation (5G) System (5GS)

FIG. 9 illustrates a wireless communication system represented as a 5G network architecture composed of core Network Functions (NFs), where interaction between any two NFs is represented by a point-to-point reference point/interface. FIG. 9 can be viewed as one particular implementation of the system 300 of FIG. 3.

Seen from the access side the 5G network architecture shown in FIG. 9 comprises a plurality of UEs 312 connected to either a RAN 302 or an Access Network (AN) as well as an AMF 900. Typically, the R (AN) 302 comprises base stations, e.g. such as eNBs or gNBs or similar. Seen from the core network side, the 5GC NFs shown in FIG. 9 include a NSSF 902, an AUSF 904, a UDM 906, the AMF 900, a SMF 908, a PCF 910, and an Application Function (AF) 912.

Reference point representations of the 5G network architecture are used to develop detailed call flows in the normative standardization. The N1 reference point is defined to carry signaling between the UE 312 and AMF 900. The reference points for connecting between the AN 302 and AMF 900 and between the AN 302 and UPF 914 are defined as N2 and N3, respectively. There is a reference point, N11, between the AMF 900 and SMF 908, which implies that the SMF 908 is at least partly controlled by the AMF 900. N4 is used by the SMF 908 and UPF 914 so that the UPF 914 can be set using the control signal generated by the SMF 908, and the UPF 914 can report its state to the SMF 908. N9 is the reference point for the connection between different UPFs 914, and N14 is the reference point connecting between different AMFs 900, respectively. N15 and N7 are defined since the PCF 910 applies policy to the AMF 900 and SMF 908, respectively. N12 is required for the AMF 900 to perform authentication of the UE 312. N8 and N10 are defined because the subscription data of the UE 312 is required for the AMF 900 and SMF 908.

The 5GC network aims at separating User Plane (UP) and Control Plane (CP). The UP carries user traffic while the CP carries signaling in the network. In FIG. 9, the UPF 914 is in the UP and all other NFs, i.e., the AMF 900, SMF 908, PCF 910, AF 912, NSSF 902, AUSF 904, and UDM 906, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 900 and SMF 908 are independent functions in the CP. Separated AMF 900 and SMF 908 allow independent evolution and scaling. Other CP functions like the PCF 910 and AUSF 904 can be separated as shown in FIG. 9. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 10:
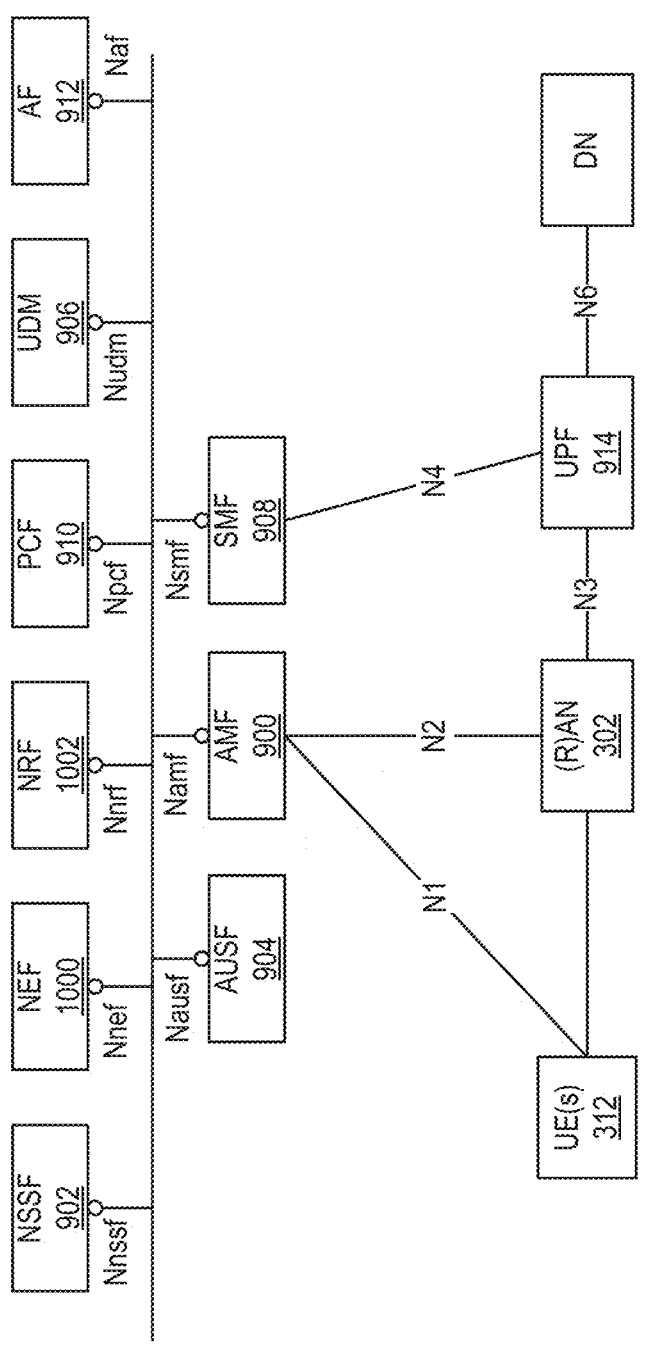

FIG. 10 illustrates a 5G network architecture using service-based interfaces between the NFs in the CP, instead of the point-to-point reference points/interfaces used in the 5G network architecture of FIG. 9. However, the NFs described above with reference to FIG. 9 correspond to the NFs shown in FIG. 10. The service(s) etc. that a NF provides to other authorized NFs can be exposed to the authorized NFs through the service-based interface. In FIG. 10 the service based interfaces are indicated by the letter "N" followed by the name of the NF, e.g. Namf for the service based interface of the AMF 900 and Nsmf for the service based interface of the SMF 908, etc. The NEF 1000 and the NRF 1002 in FIG. 10 are not shown in FIG. 9 discussed above. However, it should be clarified that all NFs depicted in FIG. 9 can interact with the NEF 1000 and the NRF 1002 of FIG. 10 as necessary, though not explicitly indicated in FIG. 9.

Some properties of the NFs shown in FIGS. 9 and 10 may be described in the following manner. The AMF 900 provides UE-based authentication, authorization, mobility management, etc. A UE 312 even using multiple access technologies is basically connected to a single AMF 900 because the AMF 900 is independent of the access technologies. The SMF 908 is responsible for session management and allocates Internet Protocol (IP) addresses to UEs. It also selects and controls the UPF 914 for data transfer. If a UE 312 has multiple sessions, different SMFs 908 may be allocated to each session to manage them individually and possibly provide different functionalities per session. The AF 912 provides information on the packet flow to the PCF 910 responsible for policy control in order to support Quality of Service (QOS). Based on the information, the PCF 910 determines policies about mobility and session management to make the AMF 900 and SMF 908 operate properly. The AUSF 904 supports authentication function for UEs or similar and thus stores data for authentication of UEs or similar while the UDM 906 stores subscription data of the UE 312. The Data Network (DN), not part of the 5GC network, provides Internet access or operator services and similar.

Figure 4:
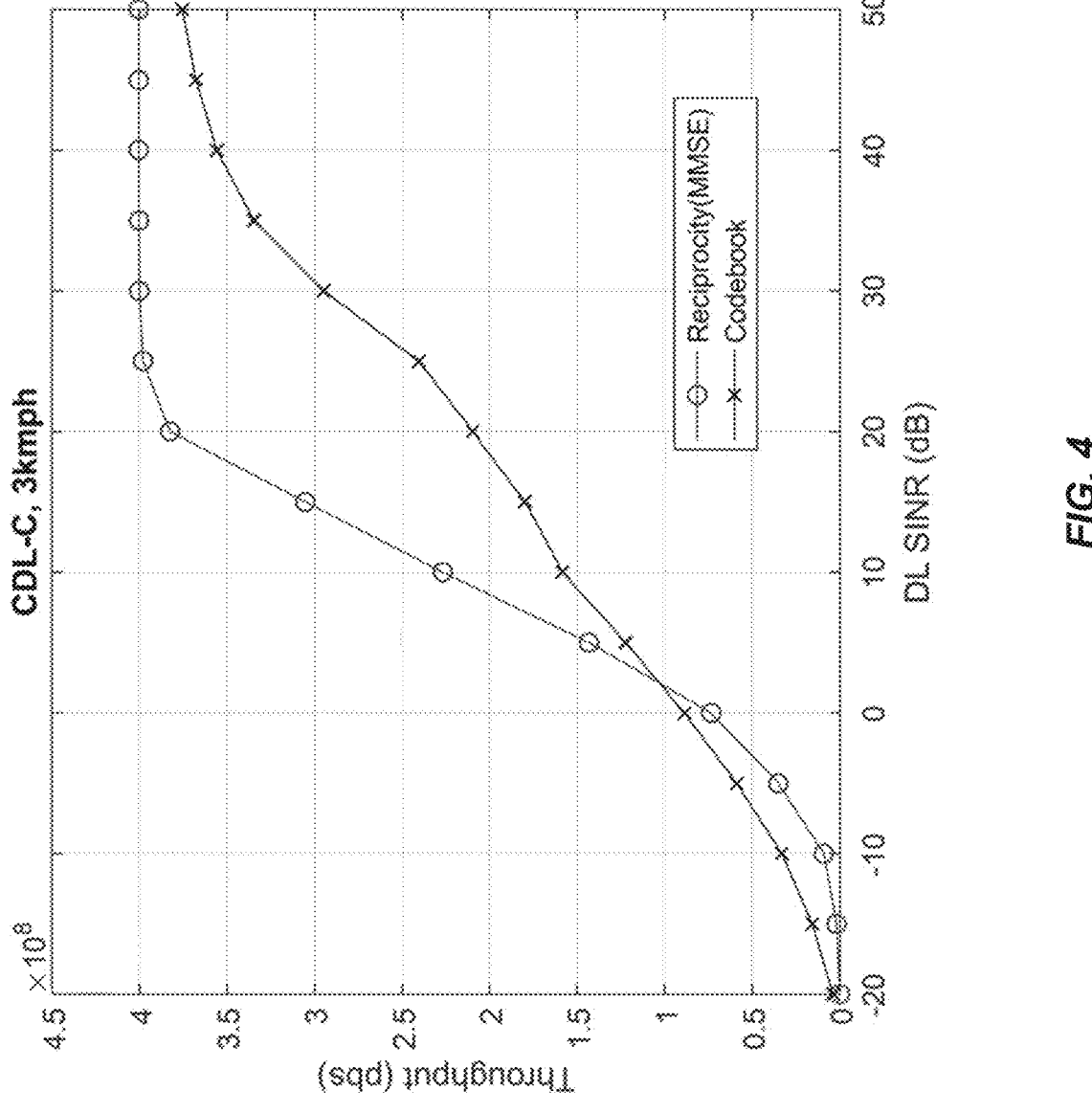
FIG. 4 illustrates a performance comparison between a codebook-based precoder and a reciprocity-based precoder (an example of non-codebook-based precoders) in a low mobility case.
Figure 5:
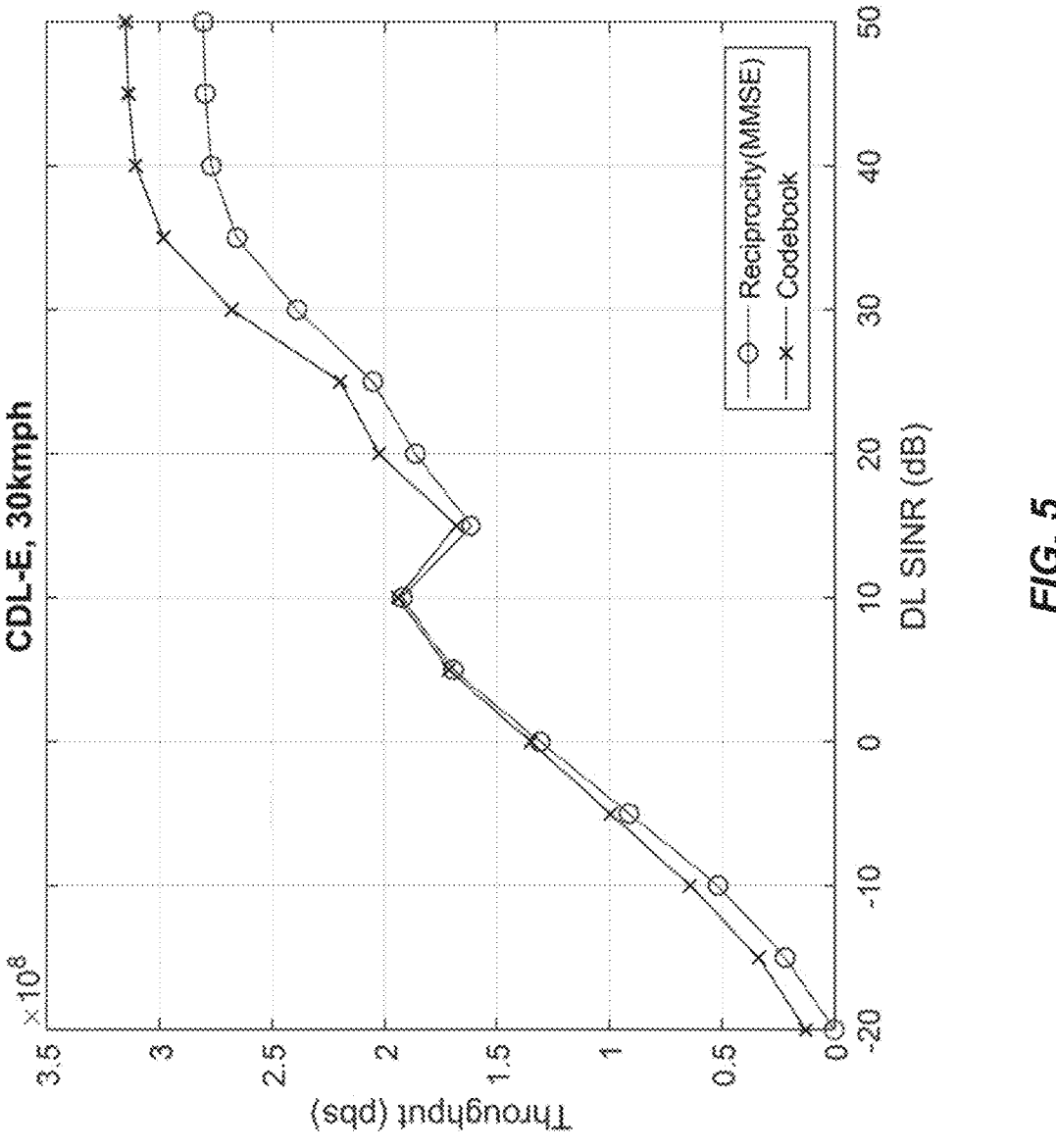
FIG. 5 illustrates a performance comparison between the codebook-based precoder and the reciprocity-based precoder in a medium mobility case.

An NF may be implemented either as a network element on a dedicated hardware, as a software instance running on a dedicated hardware, or as a virtualized function instantiated on an appropriate platform, e.g., a cloud infrastructure. Usually, as shown in FIG. 4, a reciprocity-based precoder, which is an example of a non-codebook-based precoder, can achieve higher precoding gain over a codebook-based precoder in the cell center with lower mobility, thanks to the full channel state information and advanced precoding algorithm. However, as shown in FIG. 5, at the cell edge (medium or high mobility cases) where the quality of an Uplink (UL) sounding reference signal is not good, the codebook-based precoder outperforms the reciprocity-based precoder, simulated with Clustered Delay Line (CDL)-C and CDL-E channel model.

Traditionally, several approaches are used to select the non-codebook-based precoders (e.g., the reciprocity-based precoder) or the codebook-based precoder. These approaches are:

a) Blind selection: the non-codebook-based precoder (e.g., the reciprocity-based precoder) is blindly selected if the UL sounding reference signal is available. The problem of blind selection is that the non-codebook-based precoder may be sensitive to mobility and the quality of the UL reference channel. In cases where the UE moves fast or at the cell edge with lower Signal to Interference plus Noise Ratio (SINR), the codebook-based precoder most likely outperforms the non-code-book-based precoder.

b) SINR based selection: A precoder is selected based on SINR estimation. That is, if the estimated SINR is above than a threshold, the non-codebook-based precoder (e.g., the reciprocity-based precoder) is selected. Otherwise, the codebook-based precoder is selected. The problem of SINR based selection is that it does not work well in medium mobility cases where the codebook-based precoder is better than the non-codebook-based precoder even with high SINR.

c) Mobility based selection: Another approach is to detect the mobility by estimating the Doppler spread with UL reference signals. If the doppler spread is less than a threshold, the non-codebook-based precoder (e.g., the reciprocity-based precoder) is selected. Otherwise, the codebook-based precoder is selected. The problem of mobility based selection is that it is complicated to perform the doppler estimation and to tune a proper threshold applicable for different scenarios.

The issue with the above approaches is that the precoder is not selected (by the base station 302) directly based on the spectral efficiency of the precoders, for example, the codebook based precoder and the non-codebook-based precoder (e.g., the reciprocity-based precoder). In many Radio Frequency (RF) conditions, the above approaches are not reliable.

The present disclosure proposes a UE-assisted precoder selection based on multiple Channel State Information Reference Signal (CSI-RS) resource configurations and multiple CSIs included in reports transmitted to a base station. The UE-assisted precoder selection may comprise, at the base station 302: (a) configuring two sets of CSI-RS resources, the first set for a codebook-based precoder, the second set for a non-codebook-based precoder (e.g. a reciprocity-based precoder); (b) obtaining two sets of CSI from the UE 312, corresponding to the two sets of CSI-RS resources; (c) estimating channel capacity of each precoder based on the two sets of CSI; and (d) selecting one precoder from the codebook-based precoder and the non-codebook-based precoder based on the estimated channel capacity.

Figure 6:
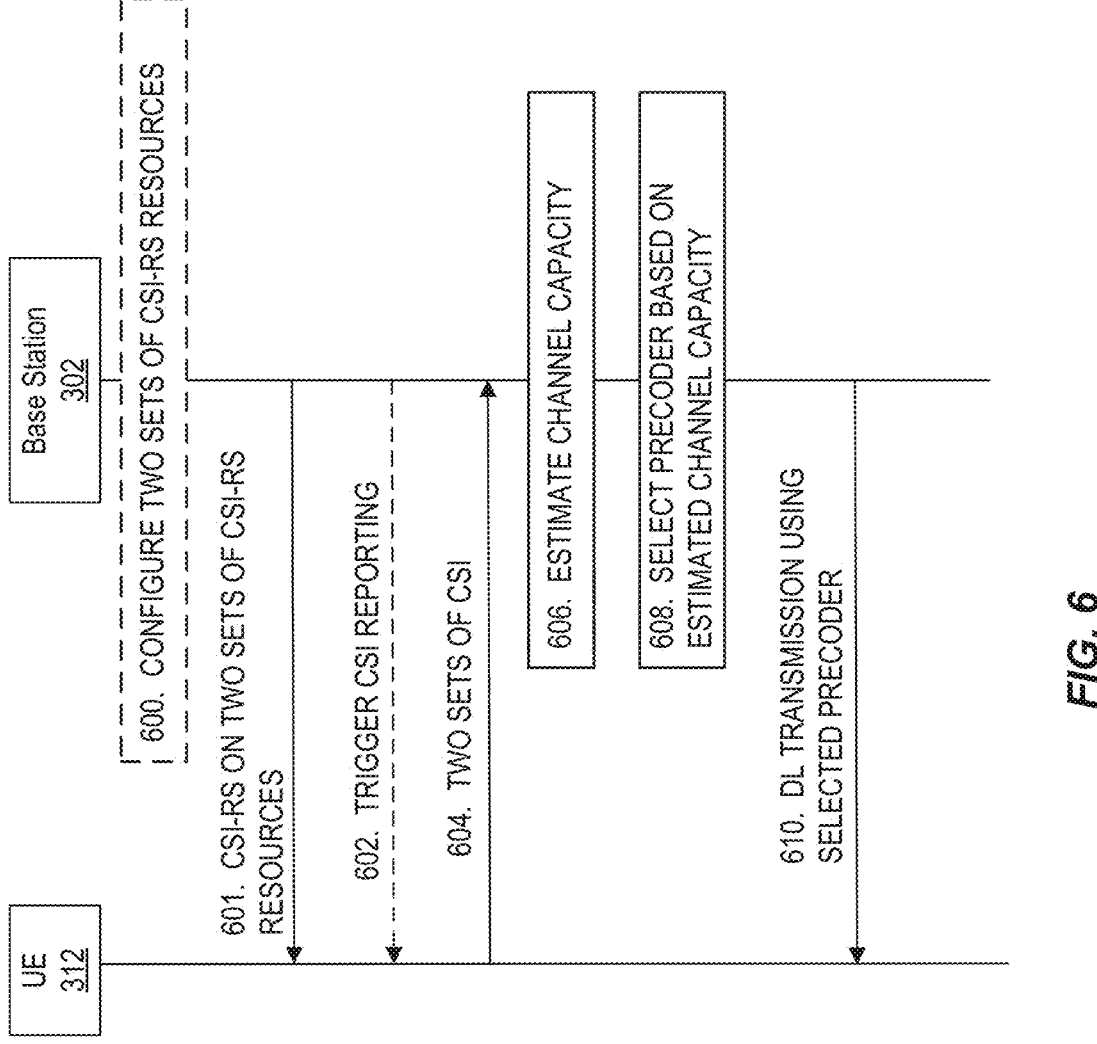
FIG. 6 is a flow chart of User Equipment (UE) assisted precoder selection procedure in accordance with some embodiments of the present disclosure.

FIG. 6 is a flowchart that illustrates the operation of the base station 302 to perform UE-assisted precoder selection in accordance with one embodiment of the present disclosure. Note that while the base station 302 perform the UE-assisted precoder selection process in this example, the UE-assisted precoder selection may be performed by another network node (e.g., another RAN node) or a network node that perform part of the function of the base station 302 (e.g., a gNB-DU).

As illustrated in FIG. 6, in step 600, optionally, the base station 302 configures two sets of CSI-RS resources on which CSI-RS is to be transmitted and measured by the UE 312. The two sets of CSI-RS resources comprise a first set of CSI-RS resources for a codebook-based precoder and a second set of CSI-RS resources for a non-codebook-based precoder. In step 601, the base station 302 transmits CSI-RS on the two set of CSI-RS resources configured for the UE 312. In step 602, optionally, the base station 302 triggers the UE 312 to send two sets of CSI based on the CSI-RS transmitted in the two sets of CSI-RS resources. Alternatively, the UE 312 may send the two sets of CSI to the base station 302 periodically without any triggering from the base station 302. In step 604, the UE 312 sends the two sets of CSI to the base station 302 (e.g., in a first CSI report including the first set of CSI and a second CSI report including the second set of CSI). In step 606, the base station 302 estimates a first channel capacity for the codebook-based precoder based on the first set of CSI and a second channel capacity for the non-codebook-based precoder based on the second set of CSI. In step 608, the base station 302 selects one precoder from the codebook-base precoder and the non-codebook-base precoder (e.g., the reciprocity-based precoder) based on the first channel capacity and the second channel capacity. In step 610, the base station 302 performs downlink data transmission to the UE 312 using the selected precoder.

The above steps of FIG. 6 are further explained below.

In step 600 of FIG. 6, the base station 302 configures the two sets of CSI-RS resources. The first set of CSI-RS resources is related to the codebook-based precoder and the second set of CSI-RS resources is related to the non-codebook-based precoder (e.g., the reciprocity-based precoder). The CSI-RS resources for the codebook-based precoder and the non-codebook-based precoder (e.g., the reciprocity-based precoder) are further explained below.

First, the first set of CSI-RS resources for the codebook-based precoder has $P_{CSI\_RS}=2N_1N_2$ ports, with a corresponding codebook configuration of $(N_1, N_2)$. Thus, in each polarization, there are $N_1$ CSI-RS ports in the horizontal direction and $N_2$ CSI-RS ports in the vertical direction. The CSI-RS resources for the codebook-based precoder can be either periodic or aperiodic. For Active Antenna System (AAS) with M antenna rows, N antenna columns, and cross-polarization, a CSI-RS port-to-antenna mapping is required to map the $2N_1N_2$ CSI-RS ports to 2MN antennas. The port-to-antenna mapping can be either cell-specific or UE-specific.

Second, the second set of CSI-RS resources for the non-codebook-based precoder (e.g., the reciprocity-based precoder) has L ports, where L is the maximum number of layers on Physical Downlink Shared Channel (PDSCH) to be supported. For example, $L=4$ for up to four layers transmission on PDSCH. The CSI-RS resources for the non-codebook-based precoder (e.g., the reciprocity-based precoder) is UE-specific beamformed with the precoding matrix generated with reciprocity-based precoders such as the Matching Filter (MF), the Zero-Forcing (ZF), the Minimum Mean Square Error (MMSE) described in the above background section. Each CSI-RS port corresponds to a transmission layer of PDSCH. The second set of CSI-RS resources for the non-codebook-based precoder (e.g., the reciprocity-based precoder) is aperiodic.

In one embodiment, two CSI associated report configuration information (CSI-AssociatedReportConfigInfo as explained in 3GPP TS 38.331 V16.6.0) are configured in single CSI-AperiodicTriggerState with setting maxNrofReportConfigPerAperiodicTrigger=2. One CSI-AssociatedReportConfigInfo is configured with the first set of CSI-RS for the codebook-based precoder. Another CSI-AssociatedReportConfigInfo is configured with the second set of CSI-RS resource for the non-codebook-based precoder (e.g., the reciprocity-based precoder). Thus, the two sets of CSI for different precoders are reported at the same time per a CSI trigger through the CSI request bits.

The CSI-ReportConfig for the first CSI-AssociatedReportConfigInfo is configured with reportQuantity setting to 'cri-RI-PMI-CQI,' which allows the UE 312 to report Channel Quality Indicator (CQI), Precoding Matrix Indicator (PMI), and a Rank Indicator (RI). The CSI-ReportConfig for the second CSI-AssociatedReportConfigInfo is configured with reportQuantity setting to 'cri-RI-CQI.' Thus, an identity matrix scaled by $1/\sqrt{v}$ will be applied at the UE 312 for a rank and CQI estimation (as explained in 3GPP TS 38.214 V16.7.0), where $v$ is the rank to be measured. In this case, the UE 312 will only report CQI and the rank. The PMI report for non-codebook-based precoder (e.g., the reciprocity-based precoder) is not needed.

In step 601 of FIG. 6, the base station 302 transmits CSI-RS on the two configured sets of CSI-RS resources to the UE 312.

In step 602 of FIG. 6, optionally, the base station 302 triggers the UE 312 to report the two sets of CSI. For example, the base station 302 includes CSI request bits in Downlink Control Information (DCI) for Physical Uplink Shared Channel (PUSCH) scheduling. Alternatively, the UE 312 may send the two sets of CSI to the base station 302 periodically without receiving a triggering from the base station 302.

In step 604 of FIG. 6, the base station 302 receives the two sets of CSI from the UE 312. The two sets of CSI may comprise a first set of CSI based on the CSI-RS transmitted on the first set of CSI-RS resources for the codebook-based precoder and a second set of CSI based on the CSI-RS transmitted on the second set of CSI-RS resources for the non-codebook-based precoder (e.g., the reciprocity-based precoder).

In one embodiment, the first set of CSI based on the CSI-RS transmitted on the first set of CSI-RS resources for the codebook-based precoder comprises:

$RI^{(1)}$: RI. The corresponding rank $rank^{(1)}=RI^{(1)}+1$.

$CQI^{(1)}:CQI$ $PMI^{(1)}=(i_{1,1}^{(1)},i_{1,2}^{(i)},i_{1,3}^{(1)},i_2^{(1)}):PMI$

In one embodiment, the second set of CSI based on the CSI-RS transmitted on the second set of CSI-RS resources for the non-codebook-based precoder (e.g., the reciprocity-based precoder) comprises:

$RI^{(2)}$: RI. The corresponding rank $rank^{(2)}=RI^{(2)}+1$.

$CQI^{(2)}:CQI$

In step 606 of FIG. 6, the base station 302 estimates a first channel capacity ($C^{(1)}$) for the codebook-based precoder based on the first set of CSI and a second channel capacity ($C^{(2)}$) for the non-codebook-based precoder based on the second set of CSI. For example, the first channel capacity ($C^{(1)}$) and the second channel capacity ($C^{(2)}$) may be estimated by the following:

$$C^{(1)} = rank^{(1)} \times f(CQI^{(1)})$$
$$C^{(2)} = rank^{(2)} \times f(CQI^{(2)})$$

In one embodiment, the function $f(\cdot)$ is a function mapping from CQI index to frequency efficiency. In one embodiment, the function $f(\cdot)$ is a function mapping from CQI index to frequency efficiency as defined in Table 5.2.2.1-2 and Table 5.2.2.1-3 of 3GPP TS 38.214 V16.7.0. Table 5.2.2.1-2 (4-bit CQI table 1) and Table 5.2.2.1-3 (4-bit CQI table 2) are reproduced in FIG. 7 and FIG. 8, respectively.

In step 608 in FIG. 6, the base station 302 selects one precoder from the codebook-based precoder and the non-codebook-based precoder (e.g. the reciprocity-based precoder) based on the estimated channel capacity. That is, if $C^{(1)}>C^{(2)}$, the codebook-based precoder is selected. Otherwise, the non-codebook-based precoder (e.g., the reciprocity-based precoder) is selected.

In step 610 in FIG. 6, the base station 302 performs downlink data transmission to the UE 312 using the selected precoder.

Figure 11:
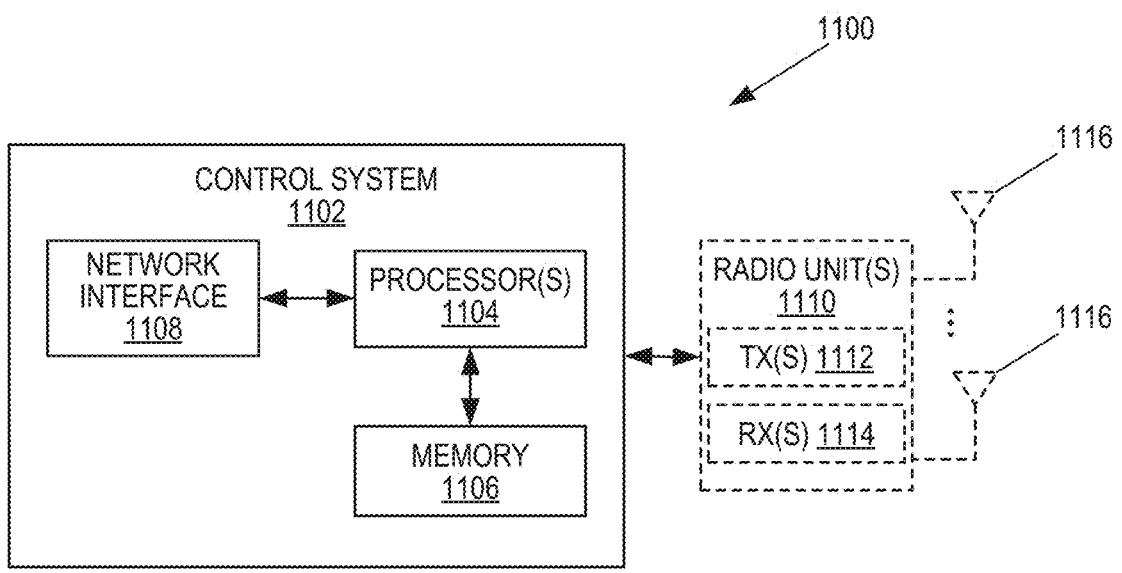
FIG. 11 is a schematic block diagram of a radio access node according to some embodiments of the present disclosure.

FIG. 11 is a schematic block diagram of a radio access node 1100 according to some embodiments of the present disclosure. Optional features are represented by dashed boxes. The radio access node 1100 may be, for example, a base station 302 or 306 or a network node that implements all or part of the functionality of the base station 302 or gNB described herein. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
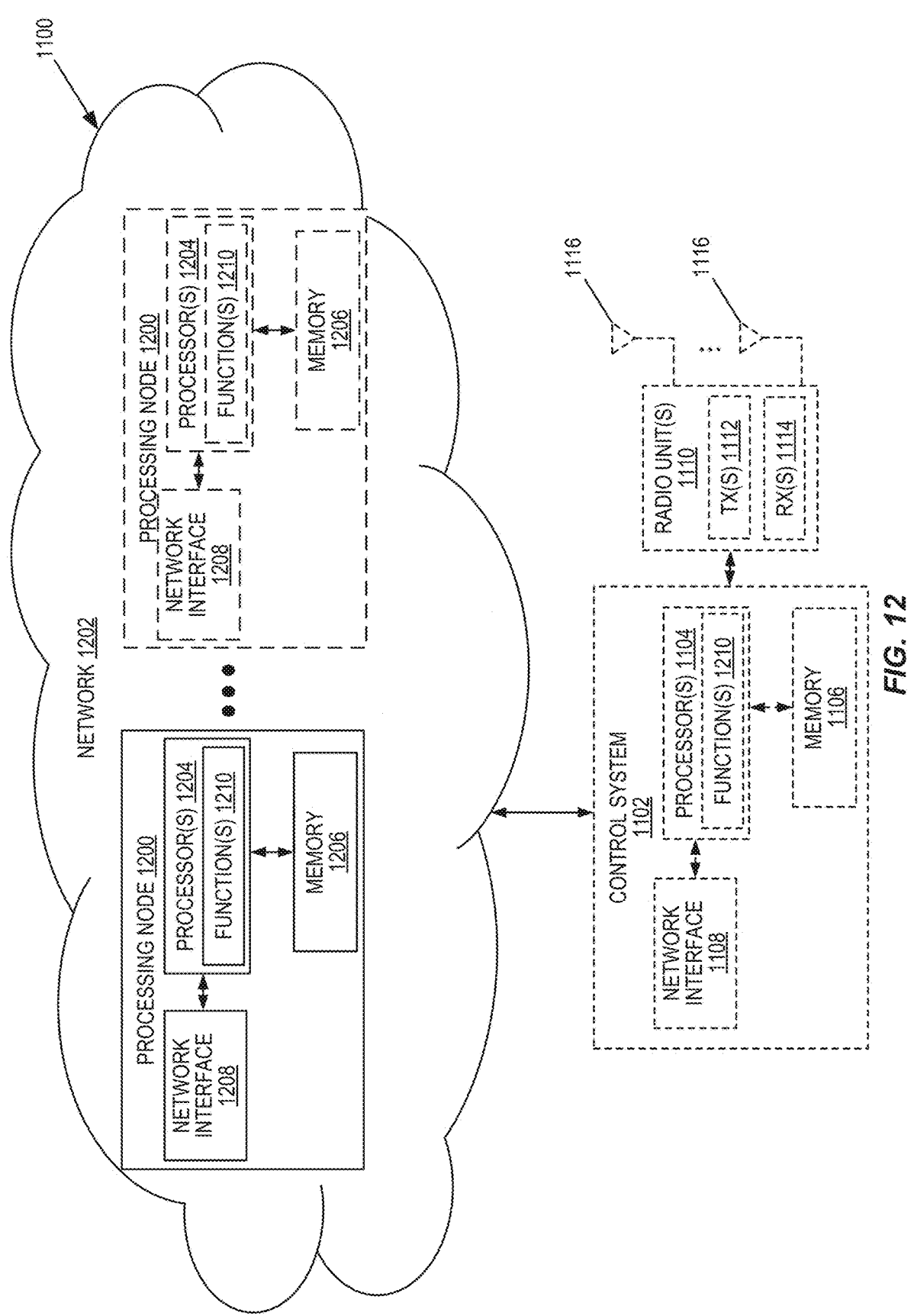
FIG. 12 is a schematic block diagram that illustrates a virtualized embodiment of the radio access node of FIG. 11 according to some embodiments of the present disclosure.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 may include the control system 1102 and/or the one or more radio units 1110, as described above. The control system 1102 may be connected to the radio unit(s) 1110 via, for example, an optical cable or the like. The radio access node 1100 includes one or more processing nodes 1200 coupled to or included as part of a network(s) 1202. If present, the control system 1102 or the radio unit(s) are connected to the processing node(s) 1200 via the network 1202. Each processing node 1200 includes one or more processors 1204 (e.g., CPUs, ASICs, FPGAS, and/or the like), memory 1206, and a network interface 1208.

In this example, functions 1210 of the radio access node 1100 described herein are implemented at the one or more processing nodes 1200 or distributed across the one or more processing nodes 1200 and the control system 1102 and/or the radio unit(s) 1110 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
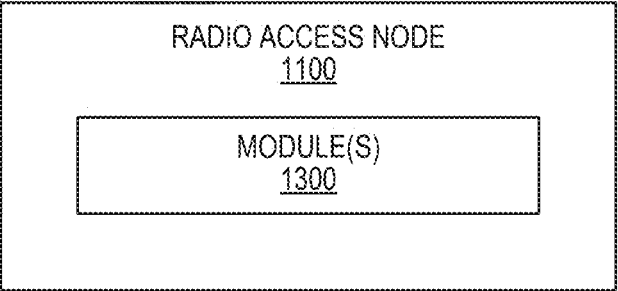
FIG. 13 is a schematic block diagram of the radio access node of FIG. 11 according to some other embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
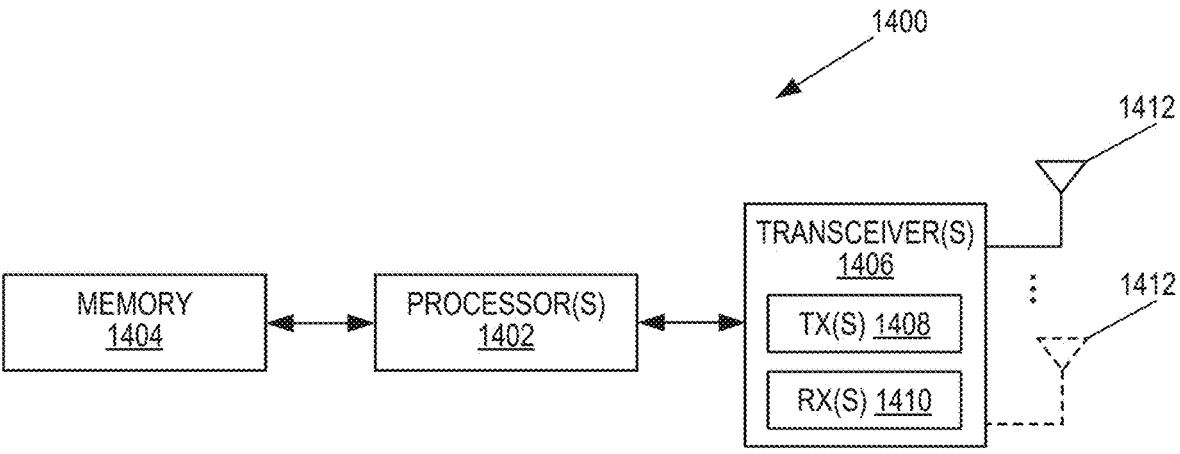
FIG. 14 is a schematic block diagram of a UE device according to some embodiments of the present disclosure.

FIG. 14 is a schematic block diagram of a wireless communication device 1400 according to some embodiments of the present disclosure. As illustrated, the wireless communication device 1400 includes one or more processors 1402 (e.g., CPUs, ASICS, FPGAS, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the wireless communication device 1400 described above may be fully or partially implemented in software that is, e.g., stored in the memory 1404 and executed by the processor(s) 1402. Note that the wireless communication device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless communication device 1400 and/or allowing output of information from the wireless communication device 1400), a power supply (e.g., a battery and associated power circuitry), etc.

In some embodiments, a computer program including instructions which, when executed by at least one processor, causes the at least one processor to carry out the functionality of the wireless communication device 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
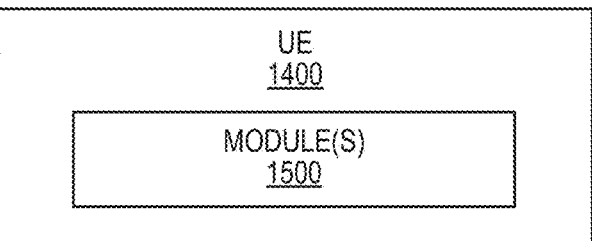
FIG. 15 is a schematic block diagram of the UE of FIG. 14 according to some other embodiments of the present disclosure.

FIG. 15 is a schematic block diagram of the wireless communication device 1400 according to some other embodiments of the present disclosure. The wireless communication device 1400 includes one or more modules 1500, each of which is implemented in software. The module(s) 1500 provide the functionality of the wireless communication device 1400 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
4G Fourth Generation
5G Fifth Generation
5GC Fifth Generation Core
5GS Fifth Generation System
AAS Active Antenna System
AF Application Function
AMF Access and Mobility Function
AN Access Network
ASIC Application Specific Integrated Circuit
AUSF Authentication Server Function
CDL Clustered Delay Line
CP Control Plane
CPU Central Processing Unit
CQI Channel Quality Indicator
CSI Channel State Information
CSI-RS Channel State Information Reference Signal
DCI Downlink Control Information
DFT Discrete Fourier Transform
DL Downlink
DN Data Network
DSP Digital Signal Processor
eNB Enhanced or Evolved Node B
EPC Evolved Packet Core
EPS Evolved Packet System
E-UTRA Evolved Universal Terrestrial Radio Access
FD-MIMO Full Dimension MIMO
FPGA Field Programmable Gate Array
gNB New Radio Base Station
gNB-DU New Radio Base Station Distributed Unit
HSS Home Subscriber Server
IP Internet Protocol
LTE Long Term Evolution
MAC Medium Access Control
MF Matched Filter
MIMO Multiple-Input Multiple Output
MME Mobility Management Entity
MMSE Minimum Mean Square Error
MRT Maximum Ratio Combining
MTC Machine Type Communication
NEF Network Exposure Function
NF Network Function
NG-RAN Next Generation Radio Access Network
NR New Radio
NRF Network Function Repository Function
NSSF Network Slice Selection Function
NZP None-Zero Power
PC Personal Computer
PCF Policy Control Function
PDSCH Physical Downlink Shared Channel
P-GW Packet Data Network Gateway
PMI Precoding Matrix Indicator
PUSCH Physical Uplink Shared Channel
QoS Quality of Service
RAM Random Access Memory
RAN Radio Access Network
RE Resource Element
RF Radio Frequency RI Rank Indicator
ROM Read Only Memory
RRH Remote Radio Head
RTT Round Trip Time
SCEF Service Capability Exposure Function
SINR Signal to Interference plus Noise Ratio
SMF Session Management Function
SRS Sounding Reference Signal
TDD Time Division Duplex
UDM Unified Data Management
UE User Equipment
UL Uplink
UP User Plane
UPF User Plane Function
ZF Zero-Forcing Those skilled in the art will recognize improvements and modifications to the embodiments of the present disclosure. All such improvements and modifications are considered within the scope of the concepts disclosed herein.

The invention claimed is:

1. A method implemented in a base station for transmitting data to a User Equipment, UE, the method comprising:
   transmitting, to the UE, Channel State Information Reference Signal, CSI-RS, on two sets of Channel State Information Reference Signal, CSI-RS, resources comprising a first set of CSI-RS resources for a codebook-based precoder and a second set of CSI-RS resources for a non-codebook-based precoder;
   receiving, from the UE, two sets of CSI comprising a first set of CSI based on the CSI-RS transmitted on the first set of CSI-RS resources for the codebook-based precoder and a second set of CSI based on the CSI-RS transmitted on the second set of CSI-RS resources for the non-codebook-based precoder;
   estimating a first channel capacity for the codebook-based precoder based on the first set of CSI and a second channel capacity for the non-codebook-based precoder based on the second set of CSI;
   selecting one precoder from the codebook-based precoder and the non-codebook-based precoder based on the first channel capacity and the second channel capacity; and
   performing downlink data transmission to the UE using the selected precoder.

2. The method of claim 1, wherein the non-codebook-based precoder is a reciprocity-based precoder.

3. The method of claim 1 further comprising configuring the two sets of CSI-RS resources for the codebook-based precoder and the non-codebook-based precoder before transmitting the CSI-RS on the two sets of CSI-RS resources to the UE.

4. The method of claim 1 further comprising configuring the two sets of CSI report configuration for the codebook-based precoder and the non-codebook-based precoder before triggering two sets of CSI report.

5. The method of claim 4 further comprising configuring reportQuantity to 'cri-RI-PMI-CQI' in the first CSI report configuration for the codebook-based precoder, allowing the UE to report a Rank Indicator (RI), a Precoding Matrix Indicator (PMI), and a Channel Quality Indicator (CQI), and configuring reportQuantity to 'cri-RI-CQI' in the second CSI report configuration for the non-codebook-based precoder, allowing the UE to report an RI and a CQI.

6. The method of claim 1, further comprising triggering, to the UE, transmission of the two sets of CSI.

7. The method of claim 1, wherein the CSI-RS transmitted on the second set of CSI-RS resources for the non-codebook-based precoder comprises L ports, wherein L is a maximum number of layers on Physical Downlink Shared Channel, PDSCH, to be supported.

8. The method of claim 7, wherein each of the L ports corresponds to a transmission layer of PDSCH.

9. The method of claim 1, wherein CSI-RS transmitted on the second set of CSI-RS resources for the non-codebook-based precoder is UE-specific beamformed with a precoding matrix generated with a particular precoder.

10. The method of claim 9, wherein the particular precoder is one of (a) a Matching Filter, MF, precoder, (b) a Zero-Forcing, ZF, precoder, and (c) a Minimum Mean Square Error, MMSE, precoder.

11. The method of claim 1, wherein the first set of CSI for the codebook-based precoder comprises (a) a first Rank Indicator, RI, (b) a first Channel Quality Indicator, CQI, and (c) a first Precoding Matrix Indicator, PMI; and the second set of CSI for the non-codebook-based precoder comprises a second RI and a second CQI.

12. The method of claim 11, wherein the first channel capacity is estimated based on the first RI and the first CQI comprised in the first set of CSI; and the second channel capacity is estimated based on the second RI and the second CQI comprised in the second set of CSI.

13. The method of claim 1, wherein selecting the one precoder between the codebook-based precoder and the non-codebook-based precoder comprises selecting the one precoder based on a comparison of the first channel capacity and the second channel capacity.

14. A device comprising processing circuitry configured to cause the device to:
    transmit, to a User Equipment, UE, Channel State Information Reference Signal, CSI-RS, on two sets of CSI-RS resources comprising a first set of CSI-RS resources for a codebook-based precoder and a second set of CSI-RS resources for a non-codebook-based precoder;
receive, from the UE, two sets of CSI comprising a first set of CSI based on the CSI-RS transmitted on the first set of CSI-RS resources for the codebook-based precoder and a second set of CSI based on the CSI-RS transmitted on the second set of CSI-RS resources for the non-codebook-based precoder;
estimate a first channel capacity for the codebook-based precoder based on the first set of CSI and a second channel capacity for the non-codebook-based precoder based on the second set of CSI;
select one precoder from the codebook-based precoder and the non-codebook-based precoder based on the first channel capacity and the second channel capacity; and
perform downlink data transmission to the UE using the selected precoder.

15. The device of claim 14 wherein the processing circuitry is further configured to cause the device to configure the two sets of CSI-RS resources for the codebook-based precoder and the non-codebook-based precoder before transmitting the CSI-RS on the two sets of CSI-RS resources to the UE.

16. The device of claim 14, wherein the non-codebook-based precoder is a reciprocity-based precoder.

17. The device of claim 14, wherein the processing circuitry is further configured to cause the device to configure the two sets of CSI report configuration for the codebook-based precoder and the non-codebook-based precoder before triggering two sets of CSI report.

18. The device of claim 14, wherein the processing circuitry is further configured to cause the device to trigger, to the UE, transmission of the two sets of CSI.

* * * * *